United States Patent [19]

Weirich

[11] 4,284,101
[45] Aug. 18, 1981

[54] PRESSURE-RELIEF VALVE DEVICES

[75] Inventor: Walter Weirich, Dortmund, Fed. Rep. of Germany

[73] Assignee: Gewerkschaft Eisenhutte Westfalia, Lunen, Fed. Rep. of Germany

[21] Appl. No.: 974,092

[22] Filed: Dec. 28, 1978

[30] Foreign Application Priority Data

Jan. 26, 1978 [DE] Fed. Rep. of Germany ....... 2803283

[51] Int. Cl.³ .............................................. F16K 15/06
[52] U.S. Cl. ..................................... 137/538; 137/494
[58] Field of Search ......................... 137/494, 496, 538

[56] References Cited

U.S. PATENT DOCUMENTS

| 1,702,550 | 2/1929 | Stevenson | 137/538 X |
| 3,057,374 | 10/1962 | Gondek | 137/538 |
| 3,482,594 | 12/1969 | Simon | 137/538 |
| 3,548,867 | 12/1970 | Grisebach | 137/538 X |

FOREIGN PATENT DOCUMENTS

| 226177 | 3/1963 | Austria | 137/538 |
| 1078663 | 11/1954 | France | 137/538 |

*Primary Examiner*—Robert G. Nilson
*Attorney, Agent, or Firm*—Thompson, Birch, Gauthier & Samuels

[57] ABSTRACT

A valve device for pressure-relief of, e.g., hydraulic props of mine equipment, has a main hollow housing into which a guide is in screw threaded engagement for adjustment purposes. The guide has a through bore which slidably receives the cylindrical stem of a valve member. The valve member has a domed head with a stop face held against an inner end face of the guide by means of a compression spring located in the housing and bearing on a thrust bushing guided and located on the head of the valve member. The stem of the valve member has a blind axial bore leading to frusto-conical outlets at its periphery via radial borings. The axial bore in the stem receives pressure fluid to be controlled via the guide bore. A sealing ring held in a groove in the guide bore engages on the periphery of the stem of the valve member. As defined hereinafter, the material of the sealing ring has a certain composition and certain other characteristics of the valve device components have a specific relationship to provide an improved performance. Excess pressure moves the valve member to raise the head off the guide end face against the restoring force of the spring to thereby allow pressure fluid to discharge from the outlets of the valve member, moved beyond the sealing ring.

10 Claims, 2 Drawing Figures

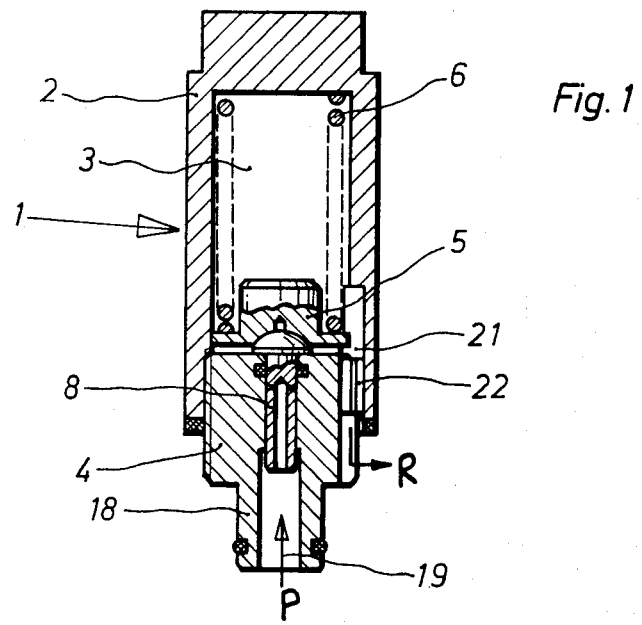
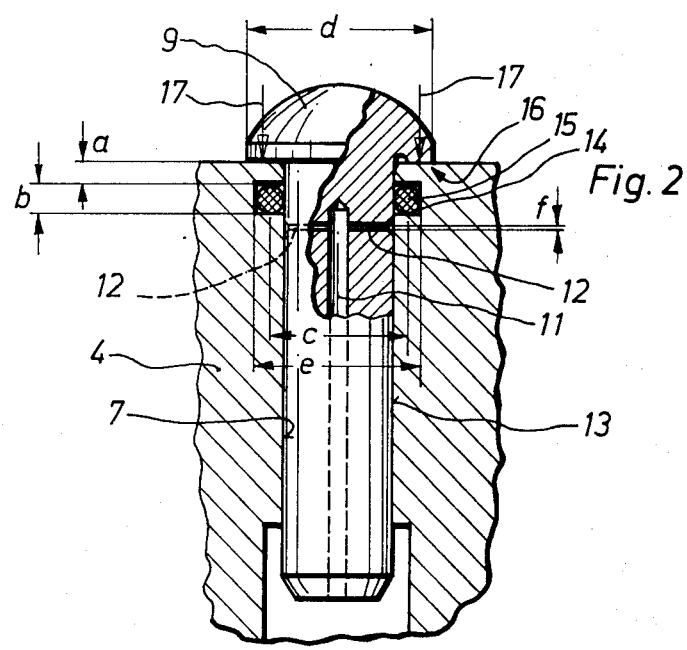

PRESSURE-RELIEF VALVE DEVICES

BACKGROUND OF THE INVENTION

The present invention relates to pressure-relief valve devices. Various hydraulically-operated units of mine equipment need to be protected against excessive pressure. This is especially the case with hydraulic pit props which support the roof of a mine working. Normally, such props would utilize an oil-water emulsion as pressure fluid at a pressure not in excess of 600 bars and conventionally in the range 200-600 bars. In adverse conditions, the pressure in the working chamber of a hydraulic prop may rise suddenly and normally a small compact pressure relief valve device is connected to the working chamber to relieve the pressure and protect the prop should the pressure rise beyond a certain critical valve. The known valve devices operate entirely automatically and close and open in accordance with the prevailing pressure. One example of a pressure relief valve device is described in the specification for German Gebrauchsmuster No. 1945206. Exacting demands are made on the valve devices since they are expected to perform reliably over long periods of time and they are expected to remain highly sensitive to pressure variation. Such valve devices are moreover expected to perform efficiently in the harsh conditions encountered in mine workings and thus need to be especially durable.

A general object of the present invention is to provide an improved valve device and, above-all, to provide a device in which the reliability and durability are improved.

SUMMARY OF THE INVENTON

In accordance with the invention, a pressure relief valve device comprises a main housing with a guide having a bore therein located in the housing. A valve member is received in the bore of the guide for axial sliding. The valve member has an axial bore which communicates via small radial borings with outlets, preferably of frusto-conical shape, at an external peripheral surface of the valve member which surface is slidable within the bore of the guide. The peripheral surface of the valve member is made exceptionally smooth with a maximum peak-to-valley depth of about 1 $\mu$m i.e. one micron. A sealing ring in a groove in the wall of the bore of the guide engages with its internal diameter in sealing relationship with the peripheral surface of the valve member and this internal diameter is only slightly smaller than that of the peripheral surface it seals to. The sealing ring is made from a resilient material, such as crepe rubber, resistant to hydrolysis and abrasion with a hardness of about 90 shore A and an elasticity of about 20%. The cord diameter of the sealing ring is made at least twice that of the radial borings in the valve member. The valve member slides along the guide bore to bring the outlets thereof into various axially spaced positions. With the outlets at one side of the sealing ring the effective valve is closed while at the other side, the valve is opened. A compression spring in the housing imparts force to the valve member to hold the outlets at one side of the valve member. Conveniently, the valve member has a head with a stop face urged by the spring against a radial end face of the guide to adopt the valve closure position. The device has a main inlet for pressure fluid leading to the axial bore and radial borings of the valve member and a main outlet leading to the other side of the sealing ring. During operation, the velve member can be displaced by excess pressure against the restoring force of the spring to allow pressure fluid to discharge from the main outlet. To enable adjustment of the pressure at which relief occurs, it is preferable for the guide to be in screw-threaded engagement with the housing. The guide can then be positionally adjusted to vary the effective force of the spring to thereby control the value of pressure at which pressure-relief occurs.

The main bore of the guide may have a divergent, e.g., frusto-conical enlargement, at its junction with the radial end face to promote efficient fluid flow. Preferably, a thrust bushing or pressure plate is guided in the main housing and transmits the spring force to the head of the valve member. A preferred design is a head with a semi-circular shape engaged in a similarly shaped recess in the thrust bushing. The head, which defines the stop face head against the end face of the guide, preferably has a diameter greater than the maximum diameter of the groove in the bore of the guide. The resultant force cf the spring preferably acts on this head at a position outside the average diameter ofthe groove in the wall of the guide bore.

By following the teachings described above, a considerably improved performance with exceptional durability can be achieved. Special surface treatment for the sliding outer surface of the valve member has hitherto been neglected or ignored and it has now been found by giving this surface exceptional smoothness, the operating performance of the device can be enhanced. The selection of the sealing ring material is also important since this leads to improved results and prevents premature fatigue or failure by ensuring the ring can deform and compress to permit the passage of the fluid outlets of the valve member just sufficiently to prevent undue wear while maintaining the operating characteristics of the ring, even despite the inclusion of contiminants in the pressure fluid. By making the internal diameter of the sealing ring just slightly smaller than the diameter of the peripheral surface of the valve member, sliding friction and adhesion can be minimized, while still maintaining effective sealing. To further reduce abrasive wear on the sealing ring, the fluid outlets of the valve member are made exceptionally smooth—also to 1 $\mu$m—and are polished. All these measures maintain the sealing ring in optimum condition throughout its life since even slight damage or abrasive wear can lead to problems.

It is desirable also to make the gap between the peripheral surface of the valve member and the bore wall of the guide over the axial region at the other side of the sealing ring, i.e., nearest the end face of the guide in the range 0.03-0.04 mm. This ensures that there is a throttle effect on the fluid flow which equalizes the dynamic pressure and ensures the sealing ring is only deformed to a sufficient extent without involving excessive deformation and leading to wear. The length of this annular region, i.e. between the groove in the guide bore wall and the end face of the guide is preferably made equal to or less than the cord diameter of the sealing ring. This in conjunction with the divergent region at the extreme end of the bore nearest the guide end face mentioned previously can allow optimum fluid flow despite the throttling effect. Moreover, these features ensure the stroke of movement of the valve member between the valve open and closed position can be kept small thereby providing a reasonably fast response time. By making the spring force act on the valve member through the guided thrust bearing and the valve member head of larger diameter than the groove in the guide bore wall and by applying this spring force outside the average diameter of the groove in the bore wall of the guide misalignment and distortion can be prevented and, furthermore, plastic deformation of the small amount of material over the annular region discussed above can be avoided. This again extends the life of the device.

The invention may be understood more readily and various other features of the invention may become apparent from consideration of the following description.

BRIEF DESCRIPTION OF DRAWING

An embodiment of the invention will now be described, by way of example only, with reference to the accompanying drawing, wherein:

FIG. 1 is a sectional side view of a pressure-relief valve device made in accordance with the invention; and FIG. 2 is a sectional side view of part of the valve device of FIG. 1, the view being taken on a somewhat larger scale than that used in FIG. 1.

DESCRIPTION OF PREFERRED EMBODIMENT

As shown in the drawing, the valve device 1 as illustrated, has a first component part 2 serving as a main housing. The housing 2 is provided with a central bore 3 open at one end to receive a second component part in the form of a guide 4. The housing 2 has an upper end wall closing off the bore 3 at the top of FIG. 1. At the lower end region of the housing 2, the bore 3 is provided with a screw-thread which mates with an external screw-thread on the guide 4, thereby permitting the guide 4 to be screwed into the housing 2 to various locations or unscrewed and detached therefrom. A third component part in the form of a pressure plate or thrust bushing 5 is mounted in the bore 3 for guided displacement longitudinally thereof. The plate 5 is urged toward the upper radial end face 16 of the guide 4 by means of a compression spring 6 located in the bore 3 to bear on a flange of the plate 5 and on the inside of the end wall of the housing 2.

The guide 4 has a central stepped through bore. The upper small-diameter region 7 of this bore slidably receives the stem of a fourth component part in the form of a valve member or piston 8. The member 8 has an enlarged semi-circular head 9 adjoining its main cylindrical stem. This head 9 is provided with a radial face engaging on the upper end face 16 of the guide 4. The plate 5 is provided with a central semi-circular recess accommodating the head 9 of the member 8. The member 8 has a blind central axial bore 11 open to the lower end of the member within the bore in the guide 4 to receive pressure fluid. Two small radial borings 12 communicate with the bore 11 and lead to the peripheral exterior 13 of the stem of the member 8 via frusto-conical outlets, as shown in FIG. 2.

An annular groove 14 is provided in the region 7 of the bore of the guide 4 near the upper end face 16 of the latter. A sealing ring in the form of an O-ring 15 is located in the groove 14 to engage in sealing manner on the peripheral exterior 13 of the stem position of the member 8. The O-ring 15 has an internal diameter only slightly smaller than that of the valve stem, i.e., the surface 13, and is preferably a crepe rubber or the like resistant to hydrolysis and abrasion with a hardness of about 90 Shore A and an elasticity of about 20%. With the member 8 urged downwardly by the spring 6 and the thrust plate 5 to bring the radial stop face of the head 9 against the face 16 of the guide 4, as shown in FIGS. 1 and 2, the outlets of the borings 12 are below the O-ring 15 and the valve is closed. The member 8 can be raised with the thrust plate 5 against the force of the spring 6 to bring the outlets of the borings 12 above the O-ring 15 to thereby open the valve. A side recess 21 in the housing 2 generally communicates with the upper side of the O-ring 15 and the interior of the bore 3 from above the upper end face 16 of the guide 4 and, with a complementary side recess in the guide 4, forms a common main discharge outlet R for pressure fluid when the valve opens. A detachable locking element or pin 22 can be inserted into the side recesses to secure the guide 4 to the housing 2 in a desired location.

The valve device, as described, is preferably engaged with a further structure, such as a housing or block, of some other equipment, and the reduced-diameter lower portion 18 of the guide 4 carries a further sealing ring on its exterior which seals into this further structure to permit pressure fluid to enter the lower region of the bore of the guide 4, which serves as a main fluid inlet P. The lower end of the housing 2 is also provided with an abutment seal engageable with this structure.

As shown in FIG. 2, the upper bore region 7 of the guide 4 diverges to form a frusto-conical shape at its juncture with the upper end face 16 and this produces a favourable effect on the through flow of the pressure fluid (arrow 19) when the valve is opened. The distance 'a' from the annular groove 14 to the upper end wall face 16 is equal to or smaller than the diameter 'b' of the O-ring 15 and the diameter 'b' is at least twice the diameter 'f' of the borings 12. Preferably, the gap between the exterior surface 13 of the stem of the valve member 8 and the wall of the bore region 7 over the axial region 'a' is in the range 0.03 mm–0.04 mm. The resultant application of the force of the spring 6 on the member 8, designated by reference numerals 17, in FIG. 2 is outside the average diameter of the groove 14 designated 'c'. The diameter 'd' of the head 9 of the member 8 is greater than the maximal external diameter 'e' of the groove 14. The exterior peripheral surface 13 of the stem of the valve member 8 is finely ground and has a smoothness such that the maximum peak-to-valley depth of transitions in its surface is less than 1 μm. It is preferable to have a similar smoothness at the outlets of the borings 12.

During operation, the valve device 1 would be located to some structure as mentioned previously and would have its main inlet P communicating with pressure fluid—usually an oil-water emulsion at a pressure of 200–600 bars in equipment it is to protect. The device 1 is especially intended for use with a hydraulic prop, in which case the inlet P would communicate with the prop working chamber. The device 1 is set to operate at a certain pressure value by adjusting, i.e., screwing, the guide 4 in relation to the housing 2 to thereby control the effective force of the spring 6. As mentioned previously, once set the guide 4 can be locked to the housing 2 with the locking element 22. Once thus set, the device 1 will adopt the position depicted in the drawing with the valve closed unless the pressure of the fluid rises above the pre-set pressure value. In this event, the force on the member 8 caused by the fluid exceeds the counter force of the spring 6 and consequently the member 8 rises to bring the fluid outlets above the O-ring 15 and fluid flows (arrow 19) and passes through the outlets of the borings 12 to discharge via the discharge outlet R to thereby relieve the excess pressure. Once the pressure falls below the pre-set value, the member 8 will be restored by the spring 6 to its normal position with the valve closed.

I claim:

1. A valve device for pressure relief of hydraulic pressure fluid and especially for pressure relief of hydraulic props of mine equipment operated with an oil-water emulsion as pressure fluid at a pressure in the range of 200–600 bars, said device comprising:

a main housing defining an internal chamber closed at one end;

a guide located in the main housing, said guide having an end face at the opposite end of said chamber and a first axial bore;

a valve member having a head with an annular stop face opposed to said end face and a stem received in said first axial bore, a second axial bore in said stem which communicates via radial borings in said stem with pressure fluid outlets in the external peripheral surface of said stem, said peripheral surface having a smoothness with a maximum peak-to-valley depth of about 1 μm and being slidable within said bore, a groove in the wall of said first bore, said groove having a maximum diameter which is less than the outer diameter of said stop face, a sealing ring located in said groove to engage with its internal diameter in sealing relationship with said peripheral stem surface, the sealing ring having its internal diameter slightly smaller than the diameter of said peripheral stem surface, the axial distance between said groove and said end face being not greater than the cord diameter of said sealing ring, a spring located in said chamber to apply force to said valve member to urge said stop face against said end face and to displace said stem to a position at which communication between said pressure fluid outlets and said chamber is blocked by said sealing ring, a main inlet for pressure fluid communicating with said first and second axial bores, a main outlet for pressure fluid leading from said chamber, whereby said valve member can be displaced by excess fluid pressure against the force of said spring to axially displace said stem to a position at which said fluid outlets are between said sealing ring and said chamber, thereby permitting pressure fluid to discharge via said second axial bore, said radial borings and said pressure fluid outlets into said chamber, and from said chamber through said main outlet.

2. A device according to claim 1, wherein the guide is in screw-threaded engagement with the main housing and can be positionally adjusted to vary the effective force of the spring to thereby control the value of pressure at which pressure-relief occurs.

3. A device according to claim 1, wherein the sealing ring is made from a crepe rubber.

4. A device according to claim 1, wherein the fluid outlets of the valve member are formed as frusto-conical recesses diverging to increase in diameter relative to the radial borings.

5. A device according to claim 4, wherein the fluid outlets have a surface smoothness with a maximum peak-to-valley depth of about 1 μm.

6. A device according to claim 1, wherein the gap between the peripheral surface of the valve member and the wall of the bore of the guide in the region at the other side of the sealing ring is about 0.03 to 0.04 mm.

7. A device according to claim 1, wherein the bore in the guide has an outwardly divergent region at a radial end face of the guide at the other side of the sealing ring.

8. A device according to claim 1, wherein a pressure plate transmits the force of the spring to the valve member.

9. A device according to claim 8, wherein the pressure plate has a shaped recess which receives the head of the valve member.

10. A device according to claim 1 wherein said sealing ring has a cord diameter at least twice that of said radial borings.

* * * * *